Dec. 11, 1956     TUNG H. LIN     2,774,062
ACCELEROMETER
Filed Feb. 5, 1953
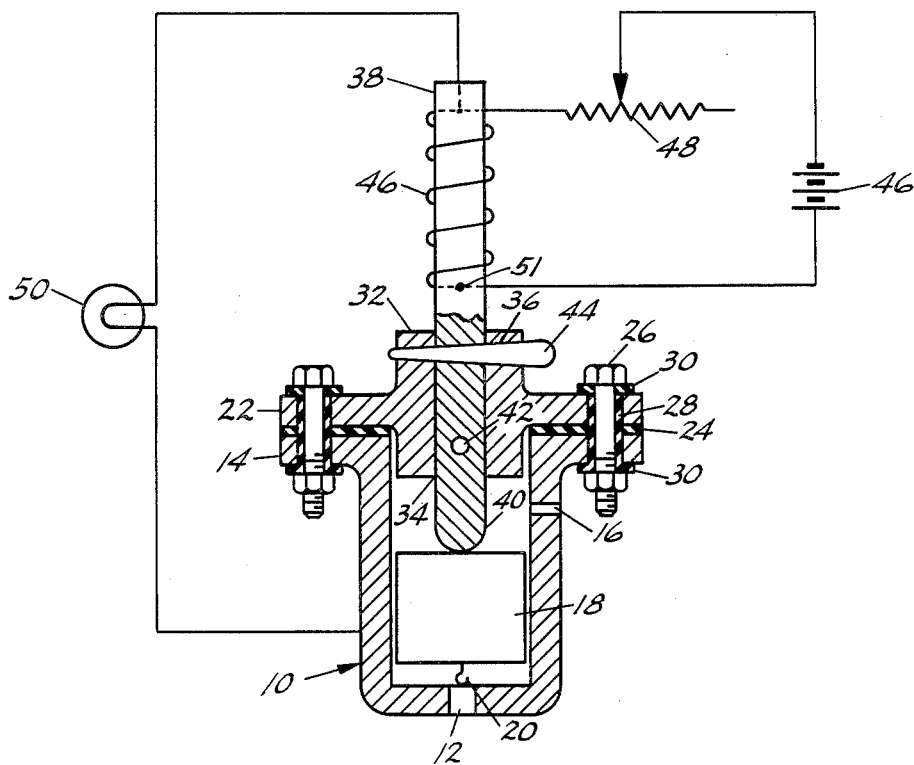
INVENTOR.
TUNG H. LIN
BY
ATTORNEY

United States Patent Office 2,774,062
Patented Dec. 11, 1956

2,774,062
ACCELEROMETER
Tung H. Lin, Detroit, Mich.
Application February 5, 1953, Serial No. 335,182
4 Claims. (Cl. 340—261)

This invention relates to accelerometers, and more particularly, to a magnetic type contact accelerometer for accurately measuring acceleration.

Accelerometers now in general use have not proved entirely satisfactory. The fundamental requirement of an accelerometer is to produce an output or response reliably indicating the variation of acceleration, usually consisting of either a periodic or a transient acceleration. It is well established that in the ideal accelerometer, the response should be proportional to the acceleration of a simple harmonic motion with the factor of proportionality being the same for all frequencies present in the action; that the phase angle lag of any particular frequency should be proportional to that frequency so as to give constant time lag for motions of all frequencies, and that the response must be damped out sufficiently fast so that the response at one instant is free from the effect of the preceding motions.

Peak acceleration usually gives critical design conditions, consequently it is of utmost interest to the designer and is, therefore, of practical importance. The incident invention aims to provide an accelerometer having these characteristics, one particularly useful for indicating the peak acceleration.

An object of the invention is to provide an accelerometer for accurately indicating the peak acceleration.

Another object of the invention is to provide an accelerometer wherein a magnet and/or an electromagnet is so used that the magnet and/or the electromagnetic force replaces the conventional compression. The electromagnetic force is regulated by adjusting the current in the winding of the electromagnet.

Another object of the invention is to provide an accelerometer for electrically producing an indication of acceleration, and acceleration of bodies moving at high velocity.

Still another object of the invention is to provide an accelerometer having a high degree of accuracy.

A further object of the invention is to provide an accelerometer which has the advantages of durability and high efficiency in operation and yet is of marked simplicity as a whole and in respect to each of its component parts so that its manufacture may be economically facilitated both as to the parts and their assembly.

Other objects and advantages of the invention will more fully appear from the following description when taken in connection with the accompanying drawings forming a part of this specification, and in which:

The single figure is a vertical sectional view of the accelerometer with the accompanying electrical circuit shown in diagram.

Referring to the drawings for more specific details of the invention, 10 indicates a cylindrical case, preferably an aluminum alloy casting. The case has a closed end and an open end. The closed end of the case has a concentrically disposed opening 12 providing access to the interior of the case and an air vent for the case. The open end of the case has a circumferential flange 14 and an air vent 16 in the wall of the case adjacent the flange, and a cylindrical iron block and/or mass 18 reciprocable in the case and electrically contacting the case and having a hook 20 therein for attaching a calibrator (not shown).

A cover plate 22 for the cylinder is supported on the circumferential flange 14 and suitably insulated therefrom and from the cylinder by a non-conducting gasket 24, and the cover plate is secured against displacement by bolts 26 passed through registering openings in the circumferential flange 14 and the cover plate 22 and electrically insulated therefrom by bushings 28 and 30.

The cover plate 22 has a concentrically disposed hub 32 provided with an axial bore 34 and diametrally disposed tapered bores 36. A soft-iron rod 38 fitted in the axial bore 34 of the hub has a rounded end 40 extended into the cylinder 10 and adapted to engage the mass 18 by point contact, and the rod also has spaced diametral tapered bores 42 adapted to register with the tapered bores 36 in the hub and tapered pins 44 wedged in the tapered bores 36 in the hub, and the tapered bores 42 in the rod serve to rigidly secure the rod in the hub.

The rod may provide a part of a permanent magnet, not shown, or as shown, the rod constitutes the core of an electromagnet and a coil 46 sleeved on the core and/or has one of its terminals connected to one terminal of a battery, and the other terminal of the coil is connected through a variable resistor 48 to the other terminal of the battery.

In operation, the case of the instrument is rigidly attached to a vibrating body and moves therewith. This excites the suspended mass into action. The relative motion between the vibrating case and the mass is related to the acceleration being measured in a definite way.

In practice the mass 18 and the inner wall of the cylinder are sprayed with graphite powder so as to provide for electrical contact between the cylinder and the mass and also to reduce friction incident to sliding moments of the mass.

When the inertia force, i. e., mass times acceleration, exceeds the electro-magnetic force, the mass 18 starts to drop. This produces an air gap between the mass 18 and the end 40 of the rod 38 and for indicating the break of contact between the mass and the rod a neon bulb 50 or any other suitable indicating device is electrically connected between the case and the coil.

When the mass 18 is in contact with the end 40 of the rod 38, the battery 46 imparts electrical potential to both the coil 46 and neon bulb 50 and when the contact breaks, the circuit connecting the neon bulb to the battery is broken and the light from the bulb is extinguished.

At the instant of the break of the contact, the inertia force, in a direction opposite to that of the electromatic force, is equal in magnitude to the electromagnetic force. The electromagnetic force for any particular magnetizing current is calibrated by having a weight on the hook 20. Hence, the acceleration at the incident of breaking the contact may be determined. It is also clear that the electromagnetic force may be adjusted by varying the current through the coil by manipulation of the variable resistance 48. The circuit of the neon bulb is in parallel with the circuit of the coil as clearly shown. In the incident structure the only moving mass relative to the case is the mass giving the inertia force in acceleration. No mechanical linkage exists, hence no extra force is required to accelerate linkage. Furthermore, as soon as the contact breaks, the magnetic force on the mass is reduced instead of being increased as is the case with conventional accelerometers, hence the incident structure has the advantage of a decided reduction of the extra inertia force required to get the finite gap after the contact breaks.

While I have shown and described a preferred embodiment of my invention, I wish it to be understood that I do not confine myself to the precise details of construction herein set forth, by way of illustration, as it is apparent that changes and variations may be made therein, by those skilled in the art without departing from the spirit of the invention, or exceeding the scope of the appended claims.

Having thus described the invention, what I claim as new and desire to secure by Letters Patent is:

1. An accelerometer comprising a movable magnetic mass, an electromagnetic circuit including a stationary electromagnet imposing an electromagnetic force on the mass for holding the mass subject to an inertia force greater than the electromagnetic force, and an indicating circuit including a part of the magnetic circuit adapted to be opened and closed by the movable mass.

2. An accelerometer comprising a case having a cover, a magnetic mass reciprocable in the case, a soft iron core supported axially of the cover and adapted to contact the mass, a coil on the core having one of its terminals connected through a variable resistor to one terminal of a battery and its other terminal connected to the other terminal of the battery providing an electromagnet imposing an electromagnetic force on the mass effective to hold the mass subject to an inertia force greater than the electromagnetic force whereupon the mass separates from the electromagnet.

3. An accelerometer comprising a vented case having a cover, a magnetic mass reciprocal in the case, a soft iron rod supported in the cover and adapted to contact the mass, a coil sleeved on the rod, a source of electrical power connected to one terminal of the coil and a variable resistor connected between the source of power and the other terminal of the coil effective to hold the mass subject to an inertia force greater than the electromagnetic force effective to separate the mass from the electromagnet.

4. An accelerometer comprising a cylindrical case having an open end and a closed end provided with a concentrically disposed opening and a vent adjacent the open end, a magnetic mass reciprocable in the case between the opening and the vent, a cover for the open end fixedly secured thereto and insulated therefrom, a magnet for holding the mass including a soft iron rod extended through the cover and fixedly secured thereto and adapted to contact the mass, a coil sleeved on the rod, a source of electrical supply, one terminal of the coil connected to the source of electrical supply and a variable resistor connecting the other terminal of the coil to the source of electrical supply effective to hold the mass subject to an inertia force of greater magnitude than the magnetic force of the magnet ample to separate the mass from the magnet.

References Cited in the file of this patent

UNITED STATES PATENTS

| | | |
|---|---|---|
| 534,519 | Rosenholz | Feb. 19, 1895 |
| 721,669 | Clark | Mar. 3, 1903 |
| 1,291,819 | Fogel et al. | Jan. 21, 1919 |
| 2,440,342 | Mayne | Apr. 27, 1948 |
| 2,464,612 | Rich | Mar. 15, 1949 |
| 2,562,983 | Clewell | Aug. 7, 1951 |